United States Patent [19]

Iljitch et al.

[11] Patent Number: 5,830,340
[45] Date of Patent: Nov. 3, 1998

[54] METHOD FOR MAKING A COMPOSITE FILTER

[75] Inventors: Trusov Lev Iljitch; Fedotov Vladimir Petrovitch; Novikov Viktor Ivanovitch, all of Moscow, Russian Federation

[73] Assignee: Trumem International LLC, Denver, Colo.

[21] Appl. No.: 811,636

[22] Filed: Mar. 5, 1997

[51] Int. Cl.$^6$ ................. C08F 2/58; C25D 13/00; C09D 5/44; B01D 59/42

[52] U.S. Cl. ................. 204/471; 204/483; 204/490; 204/499; 204/500; 204/507; 204/508; 204/509; 204/510; 204/518; 204/521; 204/542; 205/333

[58] Field of Search .................. 204/450, 483, 204/490, 471, 521, 542, 499, 500, 507, 508, 509, 510, 518; 205/333

[56] References Cited

U.S. PATENT DOCUMENTS

| | | | |
|---|---|---|---|
| 2,251,410 | 8/1941 | Koehring et al. | 29/189 |
| 3,022,187 | 2/1962 | Eyraud et al. | 117/16 |
| 4,613,369 | 9/1986 | Koehler | 75/246 |
| 4,935,139 | 6/1990 | Davidson et al. | 210/490 |
| 5,364,586 | 11/1994 | Trusov et al. | 419/2 |

FOREIGN PATENT DOCUMENTS

| | | |
|---|---|---|
| 893823 | 4/1962 | United Kingdom . |
| 83/01464 | 4/1983 | WIPO . |

*Primary Examiner*—Kathryn L. Gorgos
*Assistant Examiner*—Edna Wong
*Attorney, Agent, or Firm*—Sheridan Ross P.C.

[57] ABSTRACT

A method for forming filtration members using an electric potential to control the migration of electrically charged particles and hence to control the formation of a membrane layer on a substrate. In one embodiment, electrophoresis and electrodialysis processes are used to control the migration of sol particles and the deposition of the sol particles to provide a desired pore size associated with the membrane layer. In another embodiment, the substrate pores are impregnated with a reagent and, subsequently, electrophoresis and "reverse" electrophoresis processes are utilized to control the diffusion of ions in connection with the formation of the membrane layer.

15 Claims, 3 Drawing Sheets

METHOD FOR MAKING A COMPOSITE FILTER

FIELD OF THE INVENTION

The present invention relates to a method for making filtration members, particularly ultrafiltration members having a porous conductive substrate and membrane layer. More specifically, the present invention relates to methods for making such filtration members by utilizing an electrical process to control the formation of the membrane layer on the porous conductive substrate.

BACKGROUND OF THE INVENTION

Filtration members or units have been developed for use in a wide variety of applications. For example, filtration members can be used to separate isotopes, to filter liquids, to purify gas streams and for other separation processes. The average pore size and pore size distribution of the membrane will dictate the separation applications for which the membrane will be useful.

Various methods have been proposed for making such filtration members. Generally, a filter should be uniform and substantially free of defects. Defects in one or more layers of the filtration member, such as pinholes, can result in the anticipated filtering function being rendered unacceptable or not achieved.

U.S. Pat. No. 4,888,114 by Gaddis, et al. discloses a process for forming a filter having a metallic base. Metal oxide particles (e.g. $TiO_2$) having a size of from 0.2 to 1.0 micrometer are drawn into a porous metal substrate having a pore size of from 0.5 micrometer to 10 micrometer and excess metal oxide particles are then removed from the surface of the substrate. The metal oxide particles within the metal substrate are then sintered to form a filter element.

U.S. Pat. No. 4,935,139 by Davidson et al. discloses a process for fabricating a composite member. A metallic support having an average pore size of from 1 to 10 micrometers is covered with a porous film of sintered non-metallic particles having two average particle size distributions, one from 0.5 micrometer to 50 micrometers and the other from 0.004 micrometers to 1 micrometer. Sintering of the support and film places the film in biaxial compression due to thermal expansion mismatch of the film and the metallic support.

U.S. Pat. No. 4,613,369 by Koehler discloses a method for making a porous metal filter. A stabilized suspension of dispersed metal particles is applied to a porous metal support, such a wire mesh screen, to penetrate the openings in the porous metal support. Excess particles are removed from the surface of the support and the support is then heated to dry the stabilized suspension of metal particles and is compressed between rollers to decrease the pore size and improve the sintering characteristics. The support is then sintered to fuse the individual particles of the metal particulates to the metal support and to each other. The metal particulates have a particle size in the range of from about 1 to 200 micrometer.

U.S. Pat. No. 5,364,586 by Trusov, et al. discloses a method for making a composite membrane having a metallic substrate and a ceramic membrane layer. The process includes dispersing metallic particles on the metallic substrate to form a sublayer, pre-sintering the sublayer and covering the sublayer with ultra-fine ceramic particles. Shear force is applied to the ultra-fine ceramic particles to plastically deform the particles and the particles are thereafter sintered to form a composite filtration membrane.

None of the foregoing references address the difficulties of forming a homogenous membrane layer on a porous substrate, such that the membrane layer has no unacceptable defects. It would be useful to provide a method for making a filtration member that would consistently result in a membrane layer having uniformity and homogenous pore characteristics.

SUMMARY OF INVENTION

In accordance with the present invention, a method is provided for producing a filtration member or unit that is comprised of a number of layers including a substrate. The method involves the formation of a membrane layer over the substrate to achieve desired pore sizes in the filtration member. In one embodiment, the substrate includes a base layer and an outer layer provided on a surface of the base layer.

More particularly, the method involves a vessel containing liquid medium. The substrate is positioned in the liquid medium. The substrate is defined as having an operating side and an opposing side, which is opposite of the operating side. The substrate divides the vessel into first and second chambers. A first electrode is located in the first chamber. The first chamber is defined as containing the liquid medium found on the operating side of the substrate. A second electrode is placed in a second chamber that is defined as containing the liquid medium on the opposing side of the substrate. A first voltage potential is applied between the first electrode and the substrate and a second voltage potential is applied between the second electrode and the substrate. The first and second voltage potentials are different. Preferably, the liquid medium contained in the first chamber is different from the liquid medium contained in the second chamber.

The first voltage potential causes or influences the transportation or movement of electrically charged species or particles, such as sol particles, or ions from the liquid medium in the first chamber to the operating side of the substrate. The sol particles are deposited on and/or within the outer layer to create the membrane layer having pores of a desired size. The second voltage potential is of a magnitude that causes ions to be generated and concentrate on the opposing side. The charge of these ions from the second chamber is opposite to the charge of the ions in the first chamber. Such ions generated in the second chamber are useful in stimulating the creation of the membrane layer having the desired pore size of the filtration member. The processes associated with the operating side and the opposing side of the substrate are known, respectively, as electrophoresis and electrodialysis.

In a second embodiment, prior to being located in the liquid medium, the pores of the substrate are impregnated with a reagent for producing ions that are adapted to interact with the ions in the liquid medium. The first voltage potential is applied between the first electrode and the substrate. The voltage potential is chosen so that the higher concentration of ions is created on the operating side. An exchange reaction takes place in which the reagent is disassociated into ions. The reagent ions interact with the ions from the liquid medium in producing the membrane layer having pores of a desired size. Concomitantly, a second voltage potential is applied between the opposing side of the substrate and the second electrode. The magnitude of this voltage potential is selected such that the charge on the opposing side of the substrate relative to the second electrode is opposite to the charge on the ions that are generated in the liquid medium on the operating side of the substrate.

The second applied voltage performs two functions, namely: depletion of the opposing side of ions so as to not allow the formation of insoluble elements on the opposing side of the substrate and activation of redundant reagent solution from the opposing side of the substrate. This process associated with the opposing side of a substrate may be termed "anti" or "reverse" electrophoresis since ion migration or transportation is from the substrate to the second electrode.

Regardless of the variation employed, the methodology of the present invention controls chemical reaction in order to effect pore modification from the operating side of the substrate by formation of a membrane layer due to the deposition on the substrate of particles from the liquid medium. The membrane layer on the substrate constitutes a filtering layer that allows the passage of fluids of only predetermined and desired size characteristics.

Based on the foregoing summary, a number of objectives and advantages of the present invention are readily seen. A unique process is provided for forming the membrane layer for filtering purposes in which the process reliably and uniformly produces pores within a desired size range on a substrate. The resulting filtration unit can be used in a variety of applications and fields. A filtration unit made by the present invention is able to clean gases by removal of high-dispersed solid particles at high temperatures. Different gases can be separated from the same fluid stream. Liquids can be cleaned from fine-dispersed inclusions that have bacteria as well, with the ability to sterilize the filtration unit. Additionally, liquids can be cleaned by reverse osmosis. Further applications are equally feasible where filtration units having pore sizes of a fraction of a micron are required. Additional advantages of the present invention will become readily apparent from the following discussion, particularly, when taken together with the company drawings.

DETAILED DESCRIPTION OF THE INVENTION

A method for producing filtration members or membranes that have a homogenous membrane layer is disclosed. This method is characterized by the application of two voltage potentials or differences to opposite sides of a substrate using two electrodes, all of which are located in liquid media. Under the controlled, predetermined parameters associated with this apparatus 10, a membrane layer is formed on the substrate having pores within a desired size range such that the resulting filtration unit or member can be used in widespread applications, generally involving fluids or fluidic materials. In one embodiment, the substrate is a metal ceramic composite membrane. The composite membrane is formed from virtually any metallic material, as a base layer, and also has an inorganic ceramic compound as an outer layer formed on the base layer. In a preferred embodiment, the base layer is made from stainless steel and the outer layer includes titania, $TiO_2$. A further description of this composite membrane or substrate, as well as a manner of production thereof, is found in U.S. Pat. No. 5,364,586 issued Nov. 15, 1994 to Trusov et al. and entitled "Process for the Production of Porous Membranes," which is hereby incorporated by reference. Based on th '586 patent, the membrane layer pores can have an average size from about 30 nanometers to about 200 nanometers.

Figure 1:
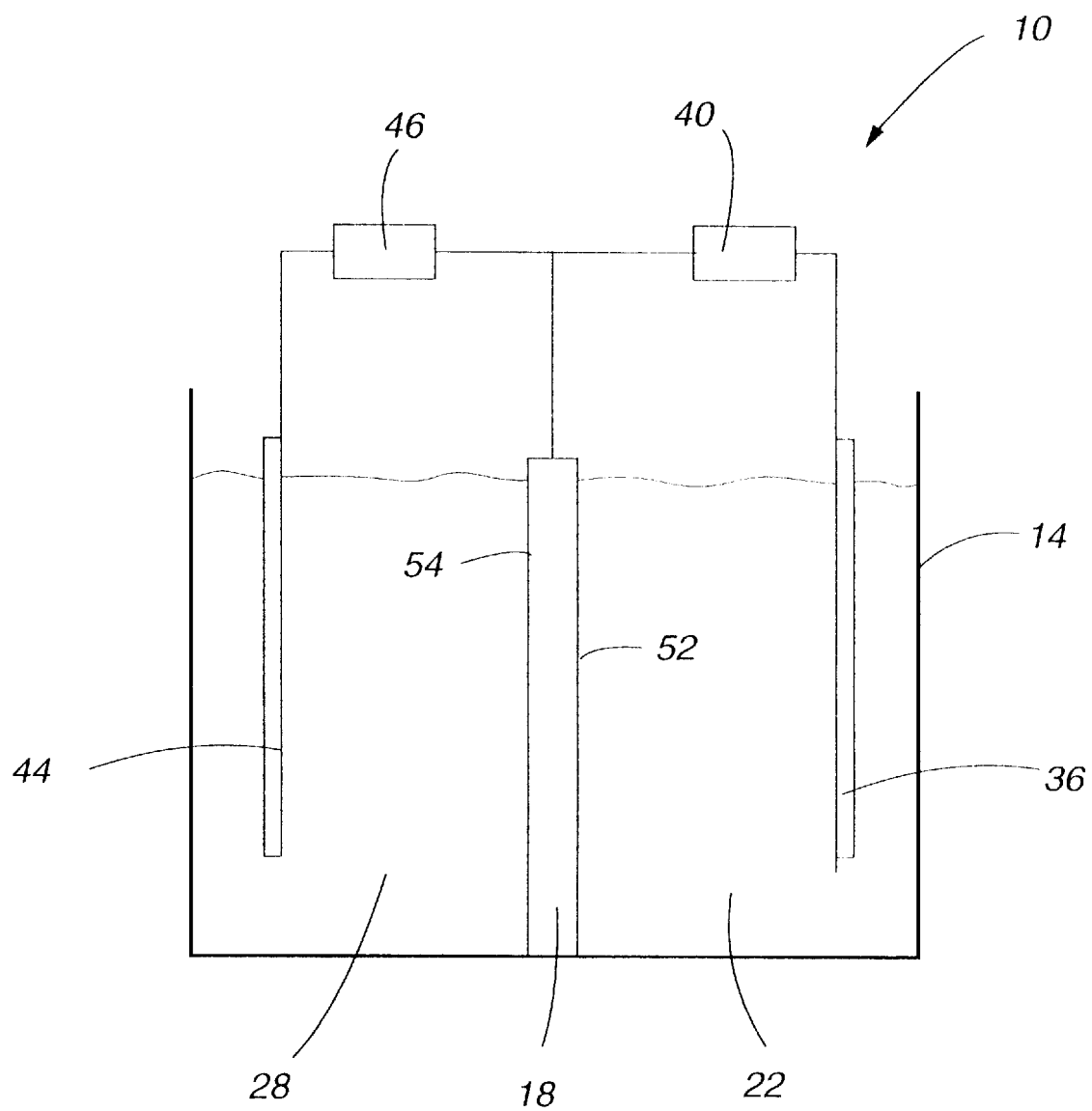
FIG. 1 illustrates schematically an apparatus useful for carrying out a method for producing a filtration member according to one embodiment of the present invention in which electrophoresis and electrodialysis processes are utilized.

With reference to FIG. 1, a description will be provided of a first embodiment. The apparatus of FIG. 1 includes a vessel 14 for containing liquid medium. A substrate 18 is located in the liquid medium and is positioned to essentially divide the vessel 14 into chambers or sections 22, 28. The liquid medium in each of the two chambers may be the same, but is preferably not. Specifically, the first chamber 22 includes suspended particles that move under the influence of an electric field or applied voltage; whereas, the liquid medium in the chamber 28 does not include such particles. In one embodiment, the particles are sol particles, such as a ceramic, e.g., ceramic oxides. In a preferred embodiment, the sol particles includes titania particles ($TiO_2$). Such $TiO_2$ sol particles have a mean size 2–5 nm. Depending on the objectives sought to be achieved in the production of filtration units, mean particle size may reach up to 200 nm. In addition to the sol particles, the liquid medium in the first chamber contains peptizing additives that shift the acidic-alkaline balance to this medium to have a pH of less than 7, such as 2–4. Besides $TiO_2$ sol particles, other sol particles are possible including: $Al_2O_3$, $SiO_2$, $MgO$. However, each type of sol particle requires its own specific pH medium parameters, peptizer-type and other parameters needed to properly generate the membrane layer with desired pore size(s).

The apparatus 10 of FIG. 1 is also schematically illustrated as including a first electrode 36 positioned in the liquid medium contained by the first chamber 22. The first electrode 36 is electrically connected to a first source of electrical power 40. The first source of electrical power 40 is also connected to the substrate 18. The substrate 18 acts as a cathode, while the first electrode 36 acts as an anode. A second electrode 44 is placed in the liquid medium contained by the second chamber 28. The second electrode 44 is electrically connected to a second source of electrical power 46. This second source 46 is electrically connected to the substrate 18, with the second electrode 44 acting as an anode and the substrate acting as the cathode. Using the first source of electrical power 40, a first voltage potential or difference is created between the first electrode 36 and the substrate 18, while a second voltage potential or difference is generated between the second electrode 44 and the substrate 18 using the second source of electrical power 46. The concentration of particles in the liquid medium contained in the first chamber 22 depends on this first voltage potential. That is, the sol particle concentration may be from 0.1 g/l for a relatively high first voltage potential of relatively long applied duration up to 100 g/l for a lower first voltage potential of shorter duration.

With respect to the application of the two voltage potentials in connection with the formation of the membrane layer by which pore size is controlled on an operating side 52 of the substrate 18, the first voltage potential (generated using the first electrical source of power 40, together with the first electrode 36 and the substrate 18) has a function of causing or influencing the movement or transportation of the particles in the liquid medium of the first chamber 22. This movement is from within the liquid medium to the operating side 52 of the substrate 18. This process is identified as electrophoresis. This process may be affected by considerably increasing the first voltage potential. On the other hand, such voltage should not be of a magnitude and/or duration that would result in unacceptable water electrolysis. In that regard, the first voltage potential can be a pulsating voltage in which impulse parameters are selected so that amplitude and impulse duration is enough for sol particle movement to the operating side 52.

Regarding the second voltage potential applied between an opposing side 54 of the substrate 18 and the second electrode 44 using the second source of electrical power 46, the direction of the applied voltage is such that ions are generated and concentrate on the opposing side 54. The charge of these ions is opposite to the charge of the sol particles. These generated ions diffuse through the thickness of the substrate 18 (because the substrate 18 is electrically conductive, there is no electric field inside of it) and neutralize sol particle charges in the pore exits from the operating side 52 of the substrate 18. This action stimulates the growth of the selective membrane layer. Non-equilibrium ion concentration on the opposing side 54 of the substrate 18 is created by means of short impulses of large amplitude application constituting the second voltage potential. As a result, the processes of ions being generated and diffused through the porous substrate 18 occur. This process is referred to as electrodialysis in which there is ion movement through a porous element under the action of electrical potentials.

With respect to more aspects of this embodiment, the substrate preferably includes a base layer made of 316L stainless steel and an outer ceramic layer that comprises the operating side 52. The mean size of pore exits on the operating side 52 should not exceed about at least ten times the pore diameters of the membrane layer that is produced as a result of the described method. For example, where the outer ceramic layer has a mean pore size of 0.1 micron, the resulting membrane layer on the base layer has a mean pore size of about 0.01 micron. The outer, ceramic layer is thin, e.g., about 20 microns. It has been experimentally shown that, if this outer, ceramic layer is about more than 50 microns, the diffusion of ions from the opposing side 54 to the operating side 52 is likely to be unacceptable for proper operation. It has also been experimentally shown that such parameters as porosity, permeability, thickness and magnitude of the second applied voltage potential associated with the opposing side 54 of the substrate 18 affect the diffusion of ions to the pores on the operating side 52. More specifically, when applying the second applied voltage potential, ion concentration on the surface substantially exceeds mean ion concentration in the solution. There is no field inside the substrate 18. The rate of ion concentration on the surface and inside the pores is a driving force of ion transportation to the operating surface of the substrate. The farther that the ions are away, due to greater substrate thickness, and the smaller the substrate verocity, the more difficult it is for the ions to transport through the substrate. However, increasing the second applied voltage potential and thus increasing the ion concentration gradiant, drives ions to the operating surface of the substrate, for a given thickness and verocity of the substrate.

The first applied voltage potential is preferably less than the voltage which will produce appreciable and unacceptable hydrolysis of the water of the liquid medium in the first chamber 22. Hydrolysis of water can be visually observed by the presence of hydrogen gas bubbles forming near the surface of the cathode (substrate 18). The hydrolysis of the water can also be reduced by applying a pulsating voltage as the voltage potential, with the amplitude of such a pulse being able to greatly exceed 1.5 volts, for example, up to about 2 kV. Pulse length should be at least about 0.5 microsecond. The pulse frequency is preferably from about 0.05 to 10 kHz. However, it will be appreciated that the peak voltage and impulse duration can be varied to achieve the desired results, i.e., to prevent substantial hydrolysis of water. The second voltage potential between the second electrode 44 and the substrate 18 is not constrained by the negative factor of hydrolysis of water. However, the second voltage potential is preferably greater than the first voltage potential to provide a sufficient quantity of ions for use in neutralizing ions associated with the sol particles.

Figure 2:
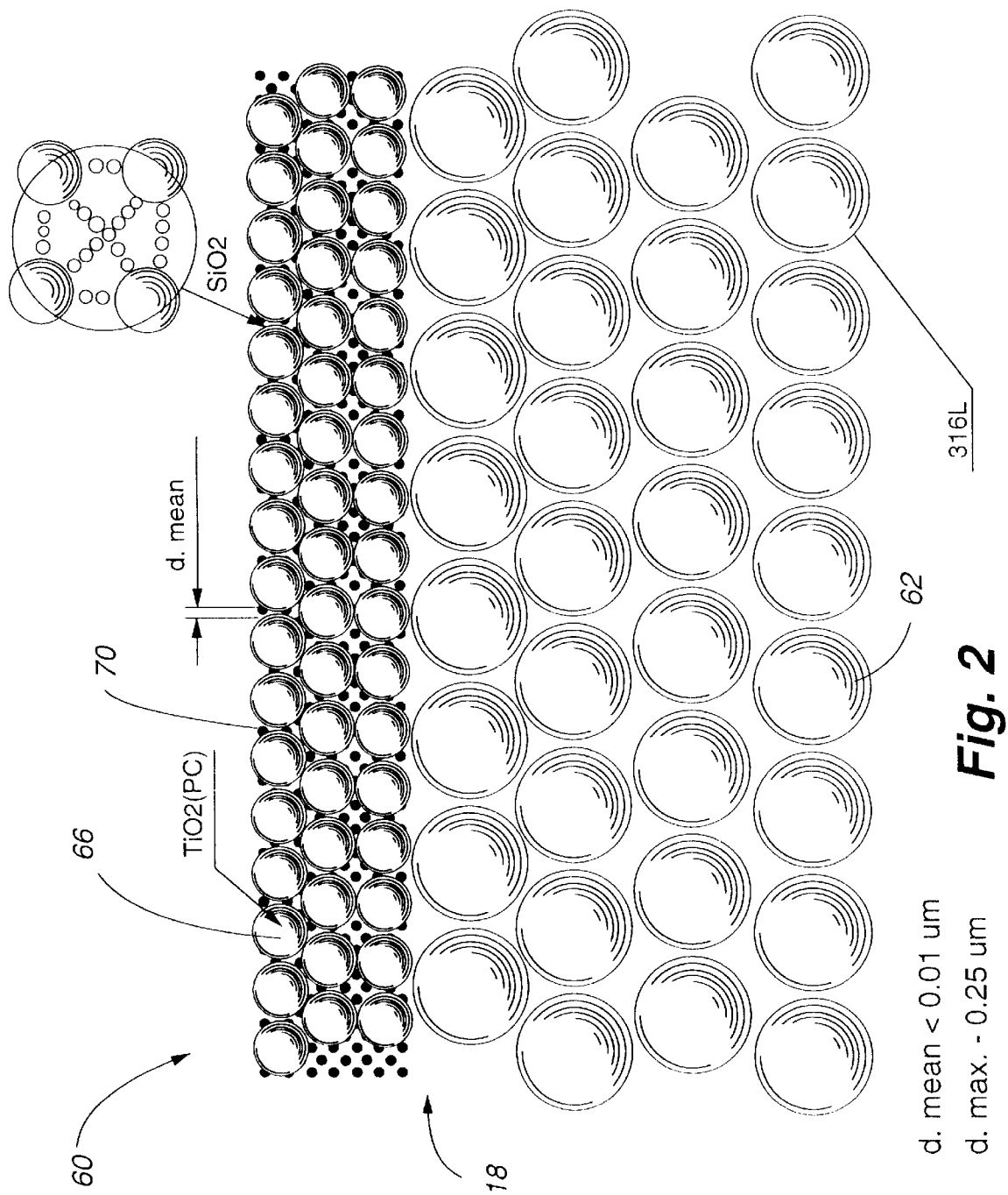
FIG. 2 illustrates diagrammatically a membrane layer formed on the substrate to provide a desired pore size.

With reference to FIG. 2, a diagrammatic illustration is provided of the filtration member or unit 60 that is produced by the foregoing method. As seen in FIG. 2, the substrate 18 includes the base layer 62 and the outer layer 66 comprised of titania ($TiO_2$). Additionally, the membrane layer 70 is defined as that layer which is produced using the aforedescribed electrophoresis and electrodialysis processes based on the applied first and second voltage potentials. In the illustrated embodiment, this membrane layer is $SiO_2$. This membrane layer 70 has a thickness of up to about 12 nanometers. After deposition of the membrane layer 70 according to the invention, the resulting filtration member 60 is preferably sintered to adhere the membrane layer 70 to the substrate 18.

Figure 3:
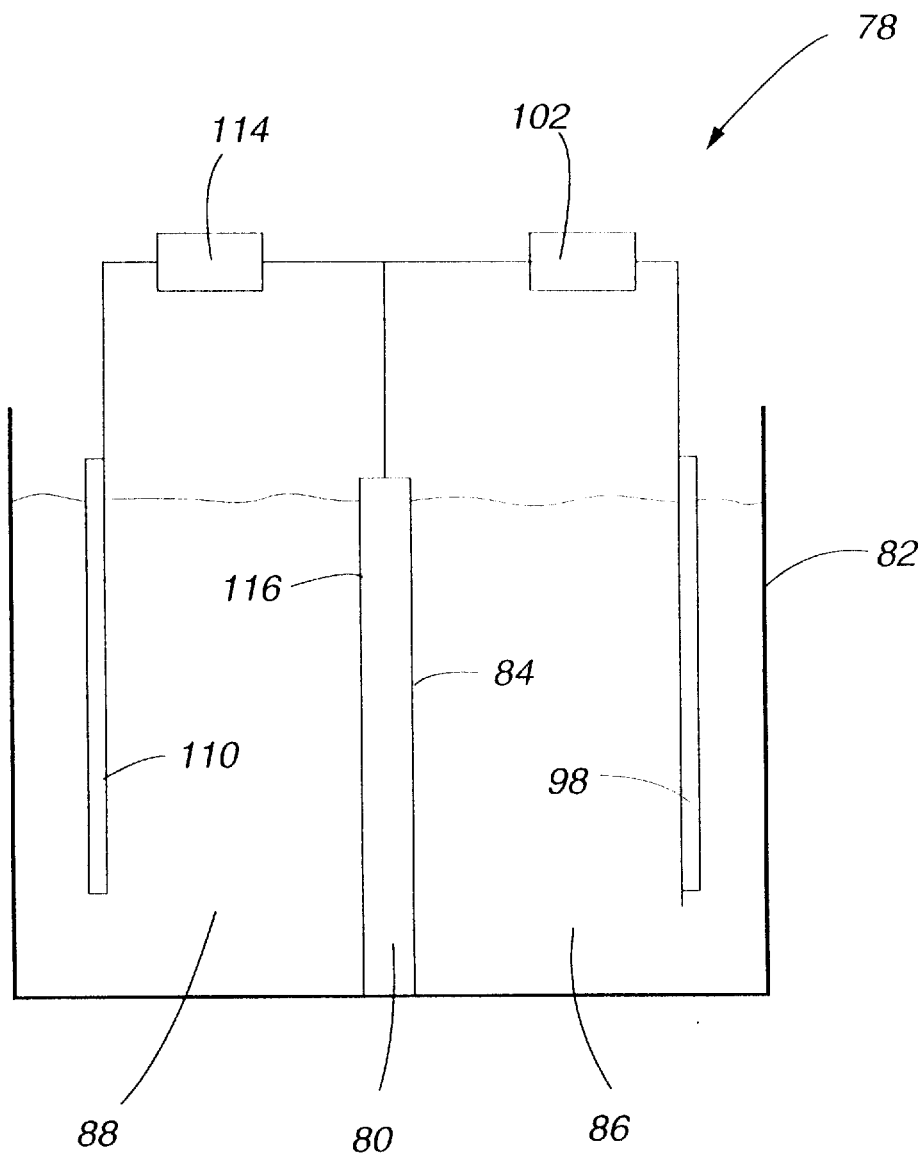
FIG. 3 illustrates schematically an apparatus useful for carrying out a method for producing a filtration member according to a second embodiment of the present invention in which pores of the substrate are first impregnated with a reagent, subsequently electrophoresis and "reverse" electrophoresis processes are utilized.

With reference to FIG. 3, a second embodiment is next described. The apparatus 78 includes a substrate 80. Unlike substrate 18, substrate 80 is first impregnated with a reagent before placed in the vessel 82. The reagent fills the entire porous space of the substrate 18. The reagent is useful in generating ions for production of the membrane layer as will be explained in greater detail later herein. The reagent may be saturated or close to saturated water solutions of such components as: $Na_2O \cdot nSiO_2$; $K_2O \ nSiO_2$; salts containing Al, Mg ions, which as a result of ion exchange reactions may form insoluble particles in water compounds.

With respect to the method of impregnation, the reagent is sputtered on an operating side 84 of the substrate 80. The substrate 80 is dried until all or substantially all of the humidity is removed. The process is repeated several times (e.g. 5–6 cycles) until full suppress breakthrough permeability is achieved. This is determined by measuring gas permeability after one or a number of such cycles. When the measurement indicates that the substrate has lost gas permeability, the number of cycles is identified. The drying is performed in a rotor conveyor where spraying injectors are from one side of the rotor conveyor and drying heaters are situated on the other side. The liquid medium which contains the reagent impregnated substrate 80 is a water solution containing exchange particles or reagents. In the embodiment in which the impregnated reagent is $Na_2O \cdot nSiO_2$ or $K_2O \cdot nSiO_2$, the exchange particles or reagent are salts containing Al, Mg ions. In the embodiment in which the impregnated reagents consist of Al and Mg salts, the exchange particles or reagent are bases containing the OH ion. Liquid medium is contained in both first and second chambers 86, 88, respectively, of the vessel 82. The concentration level of the exchange particles or reagent of the liquid medium in the first chamber 86 can vary in the range of about 0.1–4% by volume depending on the requirements of the porosity to be achieved in the filtration unit to be made and also depending on the magnitudes of the voltage potential applied to the substrate 80 on its operating side 84. With respect to the liquid medium in the second chamber 88, the exchange particle or ion concentration can vary from having the same concentration as the liquid medium in the first chamber 86 to having no exchange ions therein, as well as some percentage therebetween.

Like the first embodiment, the substrate 80 defines the first and second chambers 81, 88 such that any liquid passage between the two chambers 86, 88 is possible only through the substrate 80. Also like the first embodiment, the apparatus 78 includes a first porous electrode 98 that is electrically connected to a first source of electrical power 102. The first source of electrical power 102 is also electrically connected to the substrate 80. The first electrode 98 is placed in the liquid medium contained by the first chamber 86. A second electrode 110 is electrically connected to a second source of electrical power 114, which is electrically connected to the substrate 80. The second electrode 110 is placed in the second chamber 88 containing liquid medium in communication with an opposing side 116 of the substrate 80.

A first voltage potential is applied to the operating side 84 of the substrate 80 relative to the first electrode 98 using the first source of electric power 102. The polarity of the first source of electrical power 102 is chosen so that higher concentration of exchange ions is created on the operating side 84. Changing such electrical parameters influences the exchange reaction. The exchange reaction involves several stages including, primarily, at least portions of the impregnated reagent enter into solution and form ions. These reagent ions interact with the exchange ions of the liquid medium to generate insoluble particles that are used to form the membrane layer, which provides a layer of desired pore sizes. A possible reaction is as follows:

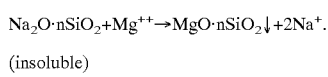

(insoluble)

In addition to the first voltage potential being applied, a second voltage potential is applied from the second source of electrical power 114 to the substrate 80 and the second electrode 110. This second voltage applied to the opposing side 116 of the substrate 80 performs the functions of depleting the opposing side 116 of exchange ions so as to not allow the formation of insoluble elements from the opposing side 116 of the substrate 80 and activation of redundant reagent solution from the opposing side 116 of the substrate 80. The polarities of the second surface of electrical power associated with the opposing side 116 are such that the charge of the opposing side 116 relative to the second electrode 110 is opposite to the exchange ions charge. Properly selected electrical parameters on the opposing side 116 of the substrate 80 take into account how to interact with the operating side 84 in order to provide the necessary and desired thickness of the membrane layer. This operation or phenomenon in which ions move from the substrate 80 to the second electrode 110 can be defined as "anti" or "reverse" "electrophoresis".

With regard to the proper application of the first voltage potential, it is important that the first voltage potential be of a magnitude and duration to achieve the electrophoresis of exchange ions to the operating side 84. If the first voltage potential is less than it should be, exchange ion concentration is insufficient and the membrane layer is defective. Alternatively, if the first voltage potential is too great, the exchange ion concentration is too high and the ions of the impregnated reagent immediately start to interact with such exchange ions resulting in a membrane layer that is too dense, weakly porous and/or has low permeability.

EXAMPLE 1

In accordance with the method of the first embodiment, a substrate 18 was provided having a porous, stainless steel base layer with mean pore size of 2 microns and a thickness of 200 microns. An outer layer of the substrate 18 was comprised of ceramic $TiO_2$ layer with mean pore size of 0.17 microns and with a thickness of 20 microns. This substrate was installed into an electrolytic cell. The first chamber 22 was filled with liquid medium containing peptized titania sol particles. The second chamber 28 was filled with liquid medium not containing peptized titania sol particles. The first applied voltage potential was a pulsating voltage with amplitude of approximately 30 volts applied to the operating side 52 of the substrate 18. The second voltage potential applied to the opposing side of the substrate 18 constituted short impulses with about 1 kV amplitude applied thereto, which short impulses were synchronized with the pulsating voltage of the first voltage potential. These short impulses were applied to the opposing side 52 of the substrate 18. The resulting filtration member including the produced membrane layer made according to this test were studied by the bubble point method and also the percentage of gas flow through the resulting pores more than 0.1 micron was studied. This study revealed that the share of gas flow through the pores sized more than 0.1 micron was about 5%.

EXAMPLE 2

In accordance with the method of the second embodiment, a double layer metal-ceramic substrate 80 was employed. This substrate 80 included a base layer of porous stainless steel with mean pore size of about 2 microns and a thickness of about 200 microns. The outer layer was comprised of ceramic $TiO_2$ with mean pore size of 0.17 micron and thickness of 20 microns. The operating side 84 of the substrate 80 was several times impregnated by liquid sodium glass and exposed under special conditions until the full polymerization (gelisation) of liquid glass in the pores. This manufactured raw material was cut into samples for conducting comparative tests. A raw material sample was installed into an electrolytic cell. The first chamber 86 was filled with 2% magnesium salt solution and the second chamber 88 was filled with distilled water. The first voltage potential was a pulsating voltage having a 15 volt amplitude. The second voltage potential, which was synchronized with the first voltage potential, had a smoothly decreasing amplitude from 300 volts to 30 volts. After the applications of these two voltages, the sample was washed and annealed. Gas flow percentage through the pores associated with the membrane layer produced by the method with a size of more than 0.1 micron was found to be less than 1%.

The foregoing discussion of the invention has been presented for purposes of illustration and description. The detailed description is not intended to limit the invention to the form disclosed herein. Variations and modifications commensurate with the above teachings, within the scope or knowledge of the relevant art, are within the scope of the present invention. The embodiments discussed hereinabove are further intended to explain the best known mode of practicing the invention and to enable others skilled in the art to utilize the invention in such, or in other embodiments, and with the various modifications required by their particular applications or uses of the invention. It is intended that the appended claims be construed to include alternative embodiments to the extent permitted by the prior art.

What is claimed is:

1. A method for producing a filtration member, comprising:

positioning a porous, conductive substrate having a thickness in a vessel containing a liquid medium means, said substrate also having an operating side and an opposing side and with said thickness therebetween;

disposing a first electrode in said liquid medium means on said operating side;

disposing a second electrode in said liquid medium means on said opposing side;

applying a first voltage potential relative to said substrate and said first electrode;

applying a second voltage potential relative to said substrate and said second electrode, and forming a membrane layer on said substrate with said membrane layer having pores of a desired pore size, said forming step including diffusing electrically charged particles through said thickness of said substrate from said opposing side using at least one of said first and second voltage potentials and also including neutralizing particle charges adjacent said operating side using said electrically charged particles.

2. A method, as claimed in claim 1, wherein:
said substrate includes a metal ceramic layer.

3. A method, as claimed in claim 1, wherein:
said particle charges that are neutralized by said electrically charged particles comprise sol particles.

4. A method, as claimed in claim 1, wherein:
said first voltage potential is different from said second voltage potential.

5. A method, as claimed in claim 1, wherein:
at least one of said first and second voltage potentials includes short impulses of large amplitude.

6. A method, as claimed in claim 1, wherein:
said operating side has pores in which the mean size thereof is no greater than about ten times the mean size of said pores of said membrane layer.

7. A method, as claimed in claim 1, wherein:
at least portions of said liquid medium means contained in said vessel on said operating side has a pH of less than about 7.

8. A method, as claimed in claim 1, wherein:
said first voltage potential is insufficient to form gas bubbles of electrolysis that are unacceptable for the formation of said membrane layer on said operating side of said substrate.

9. A method, as claimed in claim 1, wherein:
said second voltage potential is sufficient to generate ions on said opposing side to neutralize ions that exit said substrate pores in order to influence production of said membrane layer.

10. A method, as claimed in claim 1, wherein:
said membrane layer pores have an average pore size of from about 30 nanometers to about 200 nanometers.

11. A method for producing a filtration member, comprising:

positioning a porous, conductive substrate in a vessel containing liquid medium means, said liquid medium means including a first liquid medium and a second liquid medium that are different from each other, said substrate having an operating side and an opposing side;

disposing a first electrode in said liquid medium means;

disposing a second electrode in said liquid medium means;

applying a first voltage potential relative to said substrate and said first electrode; and applying a second voltage potential relative to said substrate and said second electrode, wherein application of said first and second voltage potentials influences formation of a membrane layer on said substrate with said membrane layer having pores of a desired pore size.

12. A method for producing a filtration member, comprising:

positioning a porous, conductive substrate in a vessel containing a liquid medium means, said substrate having an operating side and an opposing side, pores of said substrate are impregnated with a reagent before contact with said liquid medium means having ions that are adapted to exchange with ions in said reagent under a first voltage potential;

disposing a first electrode in said liquid medium means;

disposing a second electrode in said liquid medium means;

applying said first voltage potential relative to said substrate and said first electrode; and applying a second voltage potential relative to said substrate and said second electrode, wherein application of said first and second voltage potentials influences formation of a membrane layer on said substrate with said membrane layer having pores of a desired pore size.

13. A method, as claimed in claim 12, wherein:
said first voltage potential is sufficient to create a higher concentration of said exchange ions on said operating side.

14. A method, as claimed in claim 12, wherein:
insoluble particles are formed due to said exchange between said ions of said liquid medium means and said ions of said reagent and wherein said insoluble particles are used in forming said membrane layer.

15. A method, as claimed in claim 12, wherein:
said second voltage is sufficient to influence movement of said exchange ions to said second electrode in order to not allow formation of insoluble elements at said opposing side of said substrate.

* * * * *